United States Patent [19]
Webb

[11] Patent Number: 5,345,539
[45] Date of Patent: Sep. 6, 1994

[54] RADAR APPARATUS USING NEURAL NETWORK FOR AZIMUTH AND ELEVATION DETECTION

[75] Inventor: Andrew R. Webb, Worcestershire, England

[73] Assignee: The Secretary of State for Defence in Her Britannic Majesty's Government of the United Kingdom of Great Britain and Northern Ireland, London, England

[21] Appl. No.: 961,711

[22] PCT Filed: Oct. 30, 1991

[86] PCT No.: PCT/GB91/01894
§ 371 Date: Jan. 12, 1993
§ 102(e) Date: Jan. 12, 1993

[87] PCT Pub. No.: WO92/08149
PCT Pub. Date: May 14, 1992

[30] Foreign Application Priority Data
Nov. 2, 1990 [GB] United Kingdom ............. 9023909.6

[51] Int. Cl.$^5$ .............................................. G06F 15/18
[52] U.S. Cl. ........................................ 395/22; 342/350
[58] Field of Search ..................... 395/22, 23, 24, 27; 382/14, 15; 342/350

[56] References Cited

U.S. PATENT DOCUMENTS

| | | | |
|---|---|---|---|
| 4,945,494 | 7/1990 | Penz et al. | 395/24 |
| 4,954,963 | 9/1990 | Penz et al. | 395/24 |
| 5,001,631 | 3/1991 | Castelez | 395/22 |
| 5,003,490 | 3/1991 | Castelez et al. | 382/15 |
| 5,093,781 | 3/1992 | Castelez | 395/27 |
| 5,150,323 | 9/1992 | Castelez | 395/23 |
| 5,168,550 | 12/1992 | Sakue et al. | 395/23 |

FOREIGN PATENT DOCUMENTS
0362874 of 1990 European Pat. Off. .
WO 91/02323 of 1991 European Pat. Off. .

OTHER PUBLICATIONS

Performance of Synthetic Neural Network Classification of Noisy Radar Signals; Ahalt et al; 1988 IEEE Conf. on Neural Information Processing-Natural and Synthetic; pp. 281-288.

A Neural Network for Real-Time Signal Processing; Malkoff; 1989 IEEE Conf. on Neural Information Processing-Natural and Synthetic; 27-30 Nov. 1989; pp. 248-255.

IEEE International Conference on Neural Networks, San Diego, Calif., US, 24-27 Jul. 1988, Castelaz: "Neural Networks in Defence Applications," pp. 473-480.

IEEE Conference on Systems Engineering, Chaudhuri et al., pp. 327-330, "Neural Networks For Data Fusion", 1990.

*Primary Examiner*—Allen R. MacDonald
*Attorney, Agent, or Firm*—Nixon & Vanderhye

[57] ABSTRACT

Radar apparatus used for point-source location, where an adaptive feed forward artificial neural network is used to calculate a position vector from image information provided by radar receiving element outputs. Where an object is sensed within a field of view of a multiple output radar, then the radar receiving sensor element outputs are processed inputs as image vectors for use in input nodes of an input node layer of the artificial neural network. Typically the neural network has the same number of input nodes as the number of sensor element outputs an array within the radar receiver. Increased accuracy of point-source location can be achieved by increasing the number of hidden layers used, and/or increasing the number of nodes within each hidden layer. Training of the artificial neural network is described for (5×1), (1×5) and (4×4) radar receiving arrays, and also for idealised and noisy data.

7 Claims, 10 Drawing Sheets

RADAR APPARATUS USING NEURAL NETWORK FOR AZIMUTH AND ELEVATION DETECTION

BACKGROUND OF THE INVENTION

1. Field of the Invention

This invention relates to radar-apparatus and more specifically to radar apparatus for point source location.

2. Discussion of Prior Art

Simple radar apparatus transmits a narrow (or searchlight) beam and where the transmitted beam is returned and received, this indicates the presence of a target (or source) within the path of the searchlight beam. Angular position of the beam gives azimuthal and height co-ordinates of the source, whilst time of flight (i.e. time between transmitting and receiving a signal) gives a distance co-ordinate for the source.

One requirement of radar apparatus is the accurate position estimation of point sources. Such estimation requires measurement of distance and angular position. Distance is quite easily measured by time of flight, but angular position measurement is more difficult. Conventionally there are two stages in the accurate angular position estimation of a point-source. These are performed by surveillance radar, which provides detection and rough angular position estimation of a point source and tracking radar, which is used to provide an accurate angular position estimate.

The most popular current form of tracking radar is the monopulse type. This usually forms a mechanically steered antenna having a group of four beams on receive. A point-source is tracked in elevation and azimuth by maintaining the position in the centre of the cluster of beams (M. I. Skolnik, Introduction to Radar Systems, McGraw-Hill Book Company, New York, Second Edition, 1980).

Phased arrays or electronically steered antennas, either linear or planar arrays, provide an alternative to the mechanically steered antenna. Such arrays are formed by e.g. a x, y matrix of separate radiating or receiving elements. A beam is steered by independently varying the phase of signals applied to each radiating element in the array of radiating elements. One of the advantages of a phased array is the ability to generate a single or multiple beams simultaneously from the same array by connecting the elements into a single or different groups. These beams may be steered independently, or as a group as in monopulse, and it is often convenient to transmit a wide radiating pattern, encompassing the field of view of a cluster of the multiple receive beams. Accurate angular position estimation of the point-source is achieved by adjusting the phases so that a point-source remains in the centre of the cluster, so that processing similar to monopulse may be applied. However, a major disadvantage of this systems lies in the fact that each radiation element requires phase adjusters and associated addressing equipment. This makes phased array systems very expensive.

A different approach for receiving is that of measuring the output of each receiving detector element and to perform signal processing on each receiving detector element. A focal-plane array operates with fixed beams and although it is possible to achieve easily an estimate of the angular position of the point-source in the scene by considering the largest output of the array of receivers, more accurate angular estimation of position requires further processing. There are no standard approaches published in the literature for processing the outputs of a fixed multibeam system, either for focal-plane or for planar array systems, to give the accuracy provided by the monopulse system. However, one method which gives estimates of angular position with nearly the same accuracy as a monopulse system is based on a maximum likelihood approach. With this approach, the signal processing must be characterised by a calibration which gives a set of known responses of the array to targets at given positions. The calibration may be viewed as some form of training of the system (e.g. I. J. Clarke, "Comparison of Advanced Signal Processing Algorithms", Eurocon 1986, Paris).

The training may be achieved by moving a single source around in the far field of the observed scene of the sensors and recording the output of the system. If the outputs of all the sensors in the system are sampled simultaneously, then it is possible to obtain a vector of numbers, which gives a snapshot from the system for a given source position. All these vectors are collected together as columns of a matrix which forms a "reference library" of signals expected from each incident direction. This reference library is termed the array manifold, or point spread function.

During operation the maximum likelihood approach to angular position estimation compares a set of measured responses, or snapshot, with the stored array manifold. With this comparison made, then the angular position of the source is given as that which corresponds to the stored vector which matches the measured responses most closely. It is usual for this matching procedure to be accompanied by some form of interpolation of the error between the measured responses and the stored data vectors.

Although this approach can give performance comparable to a monopulse system, there is an inherent disadvantage in that the array manifold must be stored and thus is wasteful of processing memory capacity. Additionally, the searching of the array manifold may require extensive processing.

SUMMARY OF THE INVENTION

It is the object of this invention to provide alternative radar apparatus which is capable of point-source location.

According to this invention radar apparatus of multiple outputs (from sensors) comprises:

radar receiving sensor elements providing multiple outputs, signal processing means to giving image information from the multiple outputs, means for calculating a position vector from the image information, characterised in that, the means for calculating a position vector from the image information is an adaptive feed forward artificial neural network.

The advantage offered by the invention lies mainly in the fact that the use of the adaptive feed forward artificial neural network (herein termed the artifical neural network) obviates the need for storing the array manifold, and thus offers the opportunity for more efficient use of processing capacity. This is due to the fact that the artificial neural network stores information about an array manifold and is "trained" on typical data in order to quantify suitable weights and biassing within the network. Application of the artificial neural network to image information ensures that a position vector can be given as an output without the need to search an array manifold or interpolate the image information.

The image information is provided in the form of a vector, which is normally termed an image vector. An image vector for any given specific time represents the image "seen" in the field of view at any given specific time. A specific form of an image vector is a data vector, which is an image vector for a given specific range of time. A position vector is a vector representing the position (normally angular position) of a point-source within the field of view.

Typical types of artifical neural network include a multilayer perceptron (MLP) and a Radial Basis Function (RBF) network. Where an object is sensed within the field of view of a multiple output radar, then the radar receiving sensor element outputs are processed to provide inputs as image vectors for use by input nodes of an input layer of the artificial neural network. These inputs may be real or complex numbers. Typically, the artificial neural network will have the same number of input nodes as the number of sensor element outputs from the radar. Each input node is totally connected as a fan-in to a set of hidden layer nodes (i.e. has a connection from each input node to every hidden layer node). During transfer of the image vector data from the input layer to the hidden layer each element of the inputs is normally operated on by a scalar quantity of weight, $\mu$. Alternatively the fan-in input to the hidden layer is a linear transformation of the image vector. Weights may differ for each fan-in connection. The role of each hidden layer node is to accept the calculated values of the weighted connection between input and hidden layers and output a value obtained by passing it through a (generally, but not necessarily) nonlinear transfer function. Hidden layer node outputs may then be used as fan-in inputs to output nodes, or alternatively to a second layer of hidden layer nodes. This second layer of fan-in inputs is also weighted by a scalar which may differ for each fan-in input. Where the fan-in inputs are for output nodes, then each such fan-in input is summed at each output node. For point-source position estimation there is typically one output node for a one dimensional array, and two output nodes, giving azimuthal and elevation information for a two dimensional array. Where position vectors are required with n coordinates, then there are usually n output nodes.

As stated above, the artificial neural network may have one or more hidden layers. Where a plurality of hidden layers exists, then the improved accuracy of the position vector given by the outputs obtained from the output nodes has to be balanced against the greater processing capacity used and the longer time required for processing of the image vector data to give a position vector. In addition, training an artificial neural network with a plurality of hidden layers requires much greater effort than the training of an artificial neural network with a single hidden layer. In most circumstances, a single hidden layer provides sufficient accuracy of position vector.

A preferred artificial neural network has a local biassing associated with each hidden layer node and with each output node. These biases may be provided as an input from a node or values independent of the sensor element outputs or the image vectors.

Use of local biassing usually provides an enhanced accuracy of position vector given as output. Appropriate biassing values may be optimised during the training procedure.

Where training of the artificial neural network, i.e. allocation of suitable weighting values to each fan-in input, is carried out, this is done with training data in the form of representative image vectors as inputs and corresponding position vectors of point-sources as targets. The group of individual weightings applied to the artificial neural network is termed the set of parameters. The set of parameters is chosen so that the output position vectors {OP, p=1,2 p} for a given set of input image vectors {IP, p=1,2 p} are "close" in some sense to the desired, target outputs of position vector values, {TP, p=1,2 p}. Typically, this error criterion is a sum-of-squares error of the form $$E = \sum_{p=1}^{P} \| T^p - O^p \|^2 \quad (1)$$

where the summation runs over all the whole range of the target training set.

It is possible to train the artificial neural network on idealised data or on noisy data. Noisy data training is preferred since this is a nearer approximation to the expected operating environment of the radar apparatus in which noise may arise due to factors such as component noise, thermal noise or possibly external interference.

There are many non-linear optimisation strategies which may be used to obtain the weights of the artifical neural network which minimize the error, E, given by Equation (1). These include conjugate gradient method techniques (e.g. the Fletcher-Reeves (F-R) and the Polak-Ribiere (P-R) variants), the Broyden class of quasi-Newton methods (e.g. the Davidon-Fletcher-Powell (DFP) or the Broyden-Fletcher-Goldfarb-Shanno (BFGS) methods) or a monlinear sum-of-aquares technique such as the Levenberg-Marquardt (LM) method. The most suitable nonlinear optimisation strategy for an artificial neural network is dependent upon the number of parameters. For a number of parameters of less than 30, then it is preferable to use the LM method. Where the set of parameters is between 40 and 250, then Broyden class of quasi-Newton methods are the preferred techniques. Conjugate gradient methods are preferably used for sets of parameters much greater than 250.

BRIEF DESCRIPTION OF THE DRAWINGS

In order that the invention be more fully understood, it will be described by way of example only with reference to the following figures.

DETAILED DISCUSSION OF PREFERRED EMBODIMENTS

Figure 1:
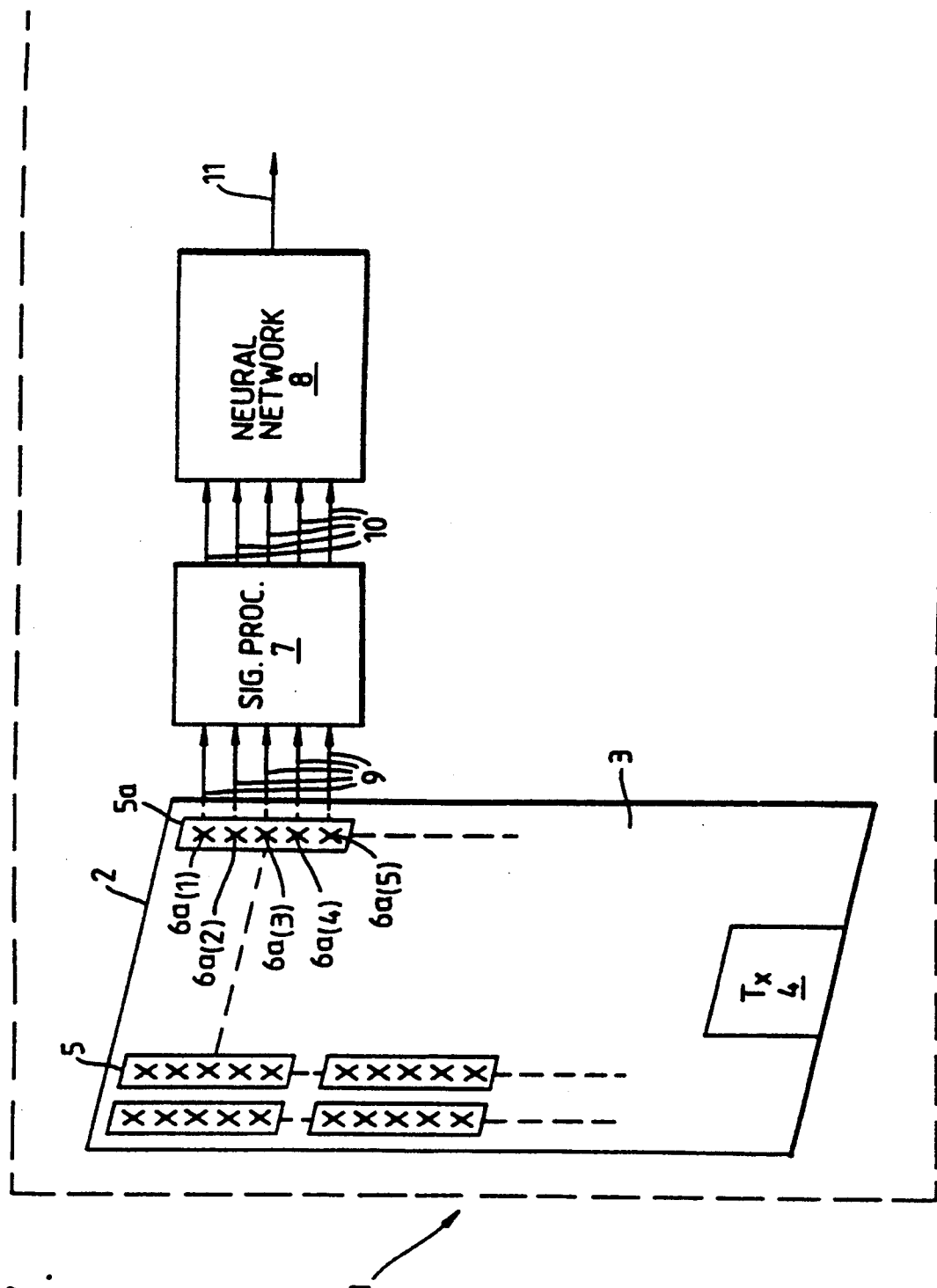
FIG. 1 is a schematic diagram of the radar.

FIG. 1 shows radar system 1, which includes an antenna 2 having a receiver 3 and a transmitter 4. Receiver 3 has many arrays 5, each array having a number of sensor elements 6. Array 5a has a 5×1 sensor element array where the sensor elements are $6a_{(1)}$–$6a_{(5)}$. Associated with array 5a, as for each array, is a signal processing unit 7 and a neural network 8. Outputs 9 from each of the sensor elements 6a of array 5a are signal processed by unit 7 in order to produce image vectors 10 for the neural network 8. Output 11 from the neural network is the form of a position vector. Position vector 11 from each array can then be further processed as required.

Figure 2:
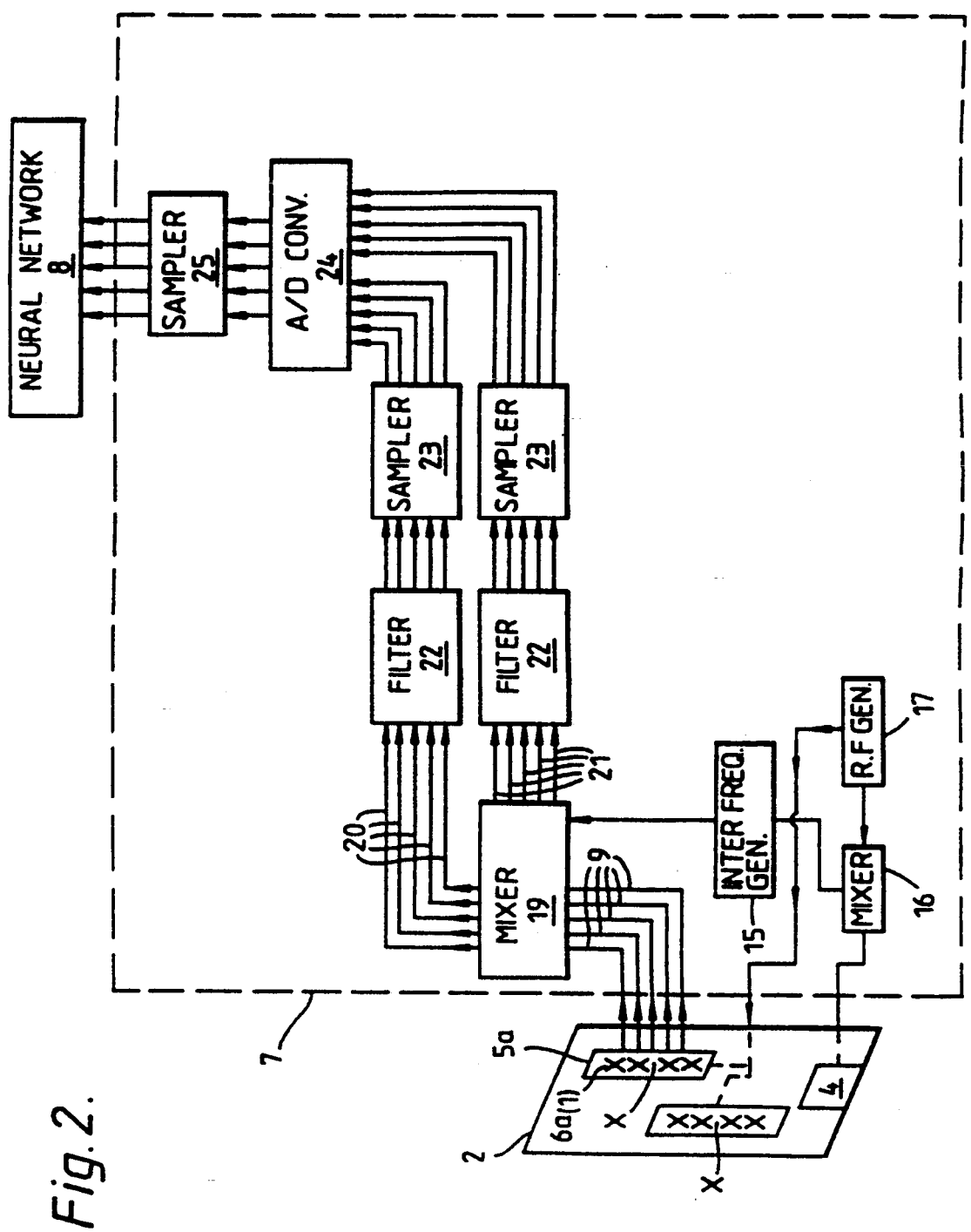
FIG. 2 is a schematic diagram of the signal processing associated with each array of the antenna of FIG. 1 giving an image vector from the radar sensor outputs.

FIG. 2 describes one arrangement by which sensor element outputs signals 9 can be changed to image vectors 10. Intermediate frequency generator 15 provides an intermediate frequency signal of about 10 mHz to be mixed at mixer 16 with radar frequency (RF) generated by generator 17. The signal transmitted from transmitter 4 is arranged to be a wave with an angular frequency of $(\omega_{rf}+\omega_{if})$ where $\omega_{rf}$ and $\omega_{if}$ are the radar frequency and intermediate frequency component respectively. A return wave is received by a focal plane array 5a on the receiver 3 of antenna 2. Where the return wave has been returned by a moving point-source within the field of view, then the return wave has an angular freuqency of $(\omega_{rf}+\omega_{if}+\omega_{df})$ where $\omega_{df}$ is the doppler frequency component.

The return wave is mixed on the antenna with an attenuated RF signal of frequency $\omega_{RF}$. This provides the signals 9 from sensors $6a_{(1)} \ldots 6a_{(5)}$ which all have angular frequencies of $(\omega_{if}+\omega_{df})$. The outputs are fed through mixer 19, where the signals are compared and mixed an intermediate frequency signal from generator 15 in order to produce in phase and quadrature signals 20 and 21. These signals 20 and 21 both have an angular frequency of $\omega_{df}$. Gain clutter filters 22 are used to filter stationary and slow moving clutter returns from objects such as buildings or trees. The filtered signals are then sampled and held in samplers 23. The sampled signals are then fed into A to D converter 24 which digitises the signals ready for sampling, and holding in sampler 25.

Signals 18 and 19 can be viewed as providing components for a sensor vector defining the output of a particular sensor at a particular time called a sensor vector. The sensor vector is usually viewed as a complex number, and where the sensor vector is $$\begin{bmatrix} I_1 \\ Q_1 \end{bmatrix}_{t_1}$$

$I_1$ and $Q_1$ are the components from signals 18 and 19, which represent the response of sensor (1) at time $t_1$ to a target within the radar viewing scene within time slot $t_1$. Each sensor will provide its own particular response for $t_1$, and the resultant vector of all responses for n sensors at $t_1$ is $$\begin{bmatrix} \begin{bmatrix} I_1 \\ Q_1 \end{bmatrix}_{t_1} \\ \begin{bmatrix} I_2 \\ Q_3 \end{bmatrix}_{t_1} \\ \begin{bmatrix} I_3 \\ Q_3 \end{bmatrix}_{t_1} \\ \vdots \\ \begin{bmatrix} I_n \\ Q_n \end{bmatrix}_{t_1} \end{bmatrix}$$

This resultant vector is called the image vector at time $t=t_1$ and may be real or complex in character, although it is generally complex. Where $t=t_1$ to $t_x$, then the vector array is called the data array as seen below $$\begin{bmatrix} \begin{bmatrix} \begin{bmatrix} I_1 \\ Q_1 \end{bmatrix}_{t_1} \\ \begin{bmatrix} I_2 \\ Q_2 \end{bmatrix}_{t_1} \\ \begin{bmatrix} I_3 \\ Q_3 \end{bmatrix}_{t_1} \\ \vdots \\ \begin{bmatrix} I_n \\ Q_n \end{bmatrix}_{t_1} \end{bmatrix} \begin{bmatrix} \begin{bmatrix} I_1 \\ Q_1 \end{bmatrix}_{t_2} \\ \begin{bmatrix} I_2 \\ Q_2 \end{bmatrix}_{t_2} \\ \begin{bmatrix} I_3 \\ Q_3 \end{bmatrix}_{t_2} \\ \vdots \\ \begin{bmatrix} I_n \\ Q_n \end{bmatrix}_{t_2} \end{bmatrix} \cdots \begin{bmatrix} \begin{bmatrix} I_1 \\ Q_1 \end{bmatrix}_{t_x} \\ \begin{bmatrix} I_2 \\ Q_2 \end{bmatrix}_{t_x} \\ \begin{bmatrix} I_3 \\ Q_3 \end{bmatrix}_{t_x} \\ \vdots \\ \begin{bmatrix} I_n \\ Q_n \end{bmatrix}_{t_x} \end{bmatrix} \end{bmatrix}$$

The data array may be further processed (not shown) before being input into the artificial neural network. For example a fast fourier transform (FFT) may be applied to each of the sensor vectors. This gives a different array of vectors with a horizontal dimension corresponding to frequency rather than time. From this transformed matrix a column of vectors (or data vector)

associated with the largest response is selected. It is this selected data vector which is normally compared to the array manifold in prior art apparatus. In this invention the data vector is fed into the artificial neural network to obtain a position vector.

Alternatively, the image vector can be fed into the neural network without application of a FFT. Use of a FFT usually substantially filters out noise, often resulting in greater accuracy of position vector outputs. However, where noise cannot be filtered out or the artificial neural network is trained with noisy data, then it is usually quicker to feed in the image vector with no application of a FFT.

Figure 3:
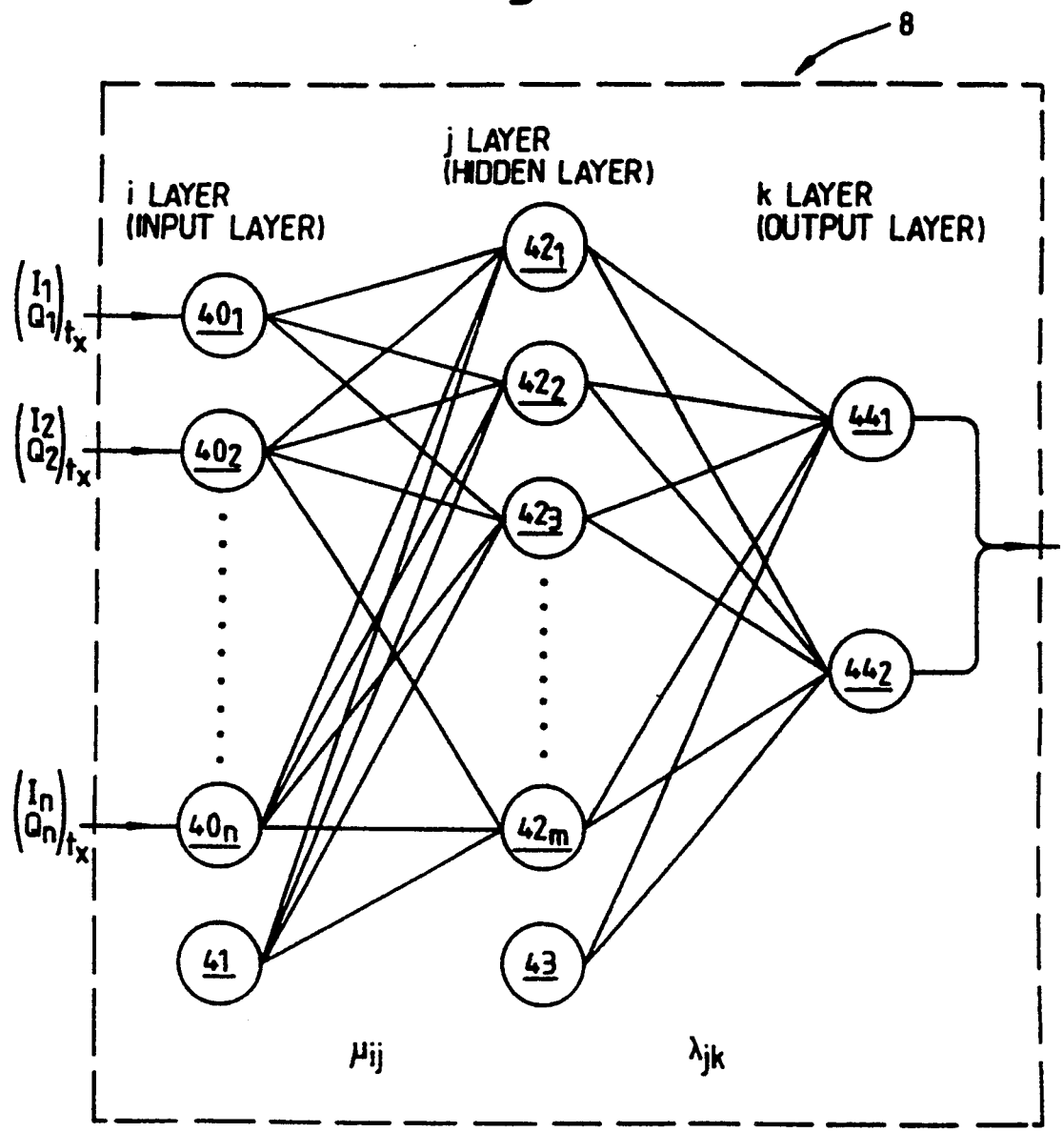
FIG. 3 is a diagram of a standard feed forward adaptive layered network geometry, shown in FIG. 1.

FIG. 3 gives the architectural structure of an adaptive feed-forward artificial neural network contain an input layer i, a hidden layer j and an output layer k. Each of these layers have a number of connecting points or nodes.

The input layer, i, has n input nodes where n is number of sensors in the array. Node $40_1$ $40_2$ and $40_3$, are the input nodes for image vectors supplying information from sensors $6a_{(1)}$, $6a_{(3)}$ and $6a_{(3)}$ respectively, whilst node $40_n$ is the input node for image vectors supplying information associated with sensor $6a_{(n)}$. Node 41 is a constant output unity. Each of the input layer nodes of the input layer i is totally connected as a fan-in input to a hidden layer j with hidden layer nodes $42_1$, $42_2$, $42_3$, . . . $42_m$. Associated with each link between the input layer nodes ($40_1$, $40_2$ . . . $40_n$) and the hidden layer nodes ($42_1$, $42_2$, . . . $42_m$) is a weight $\mu_{ij}$ such that $\mu_{ij}$=weight between node $40_i$ and node $42_j$. Similarly $\mu_{oj}$=weight between node 41 and node $42_j$, $\lambda_{jk}$=weight between node $42_j$ and node $44_k$, and $\lambda_{ok}$=weight between node 43 and node $44_k$. Usually the fan-in to a hidden layer node takes the form of a hyperplane (i.e. a generalisation of co-ordinates for n dimensions): the input to hidden layer nodes ($42_1$, $42_2$, . . . $42_m$) is of the form $$\theta_j = \sum_{i=40_1}^{40_n} x_i \mu_{ij} - x^* \mu_j \quad (2)$$

and where $x=(x_1, x_2, \ldots, x_n)^*$ is the image vector, $\mu_j$ is the vector of n scalar values associated with hidden layer nodes j and * denotes the transpose. The role of each hidden layer node is to accept the value provided by the fan-in and output a value obtained by passing it through a (generally, though not necessarily) nonlinear transfer function, $\phi$, such that the output of hidden layer node $42_j$ is $$\phi_j = \phi(\mu_{oj} + \theta_j) = \phi(\mu_{oj} + x^* \mu_j) \quad (3)$$

where $\mu_{oj}$ is the scalar applied to local constant unity output at node 41, and j=1 to m.

The hidden layer nodes (i.e. $42_1$, $42_2$, . . . , $42_m$) and a second node of constant unity output 43 are fully connected in a fan-in input to an output layer k. Where the artificial neural network is for a linear array then there is usually one output node only. Where the array is 2 dimensional then there are usually two output layer nodes $44_1$ and $44_2$. The output node $44_1$ provides the elevation $\xi$ of a source within a scene, and output node $44_2$ provides the azimuth $\eta$ of such a source. To each fan-in input to output layer k nodes a scalar $\lambda_{jk}$ is applied, and thus the value received at an output layer node. $\psi_k$ is a weighted sum of the output values from all of the hidden nodes $$\psi_k = \sum_{j=42_1}^{42_m} \lambda_{jk} \phi_j + \lambda_{ok} \quad (4)$$

where $\lambda_{ok}$ is a bias placed on the output of the hidden layer fed to the output layer. In general the output from an output node $44_1$, $44_2$ is a nonlinear function of its input $$\psi_k = \Phi_k(\lambda_{ok} + \lambda_k^* \phi) \quad (5)$$

where $\lambda_{ok}$ is the scalar applied to node of constant unity output 43, $\phi$ is the $\phi = (\phi_{421} \ldots \phi_{42\,m})$ vector of hidden node outputs, * denotes the transpose and $\Phi_k$ is the nonlinearity for k=1, 2 applied by the output nodes. However, this is taken as a linear function.

The above description relates to a feed forward network with one hidden layer. There may be several hidden layers the outputs from each node of a hidden layer fully connected as a fan-in to the inputs of each node of the succeeding layer.

Thus the adaptive feed-forward network provides a transformation mapping from a n-dimensional input (where n=the number of radar sensors) to a two-dimensional (i.e. $\xi$ and $\eta$) space via an intermediate m-dimensional characterisation space. This mapping is totally defined by the topology of the network (in particular how many hidden layers and how many nodes within each hidden layer are employed), the nonlinear transfer functions and the particular weights and local biases. The appropriate set of weights and biasses are found by a "training" procedure.

Typical weights for artificial neural networks having 15 hidden layer nodes are shown in tables 1, 2 and 3. Table 1 gives weights for a 5×1 array trained on data with no noise, Table 2 gives weights for the same array trained on noisy data and Table 3 gives weights for a 4×4 array trained on data with no noise. Thus, Tables 1 and 2 give weights for bias 41 and each of the input layer nodes (n=1, 2, . . . 5) to the hidden layer nodes (m=1, 2, . . . 15), and bias 43 and each of the hidden layer nodes (m=1, 2, . . . 15) to output layer node $44_1$. Table 3 gives weights for bias 41 and each of the input layer nodes (n=1, 2, . . . 16) to the hidden layer nodes (m=1, 2, . . . 15) and of bias 43 and each of the hidden layer nodes (m=1, 2, . . . 15) to each of output layer nodes $44_1$ and $44_2$.

TABLE 1

|  | 41 | $40_1$ | $40_2$ | $40_3$ | $40_4$ | $40_5$ | $44_1$ |
| --- | --- | --- | --- | --- | --- | --- | --- |
| $42_1$ | 9.4853185 × $10^{-2}$ | 2.408369 | 1.059832 | −0.1323292 | −1.993936 | −1.199906 | −2.584625 |
| $42_2$ | 1.621715 | 8.929111 | 7.677868 | 0.3189575 | −5.321190 | −8.521118 | 6.580551 |
| $42_3$ | 0.1893288 | −1.150627 | 7.8633361 × $10^{-2}$ | 5.4501346 × $10^{-3}$ | 0.6466603 | 0.9752769 | −0.4497064 |
| $42_4$ | −1.933701 | −3.489530 | −2.450211 | 0.7529522 | 5.010450 | 6.447741 | 8.490133 |
| $42_5$ | −0.6197526 | 2.974035 | 1.746617 | −0.3995074 | −0.8523117 | −2.958785 | −2.284761 |
| $42_6$ | −8.9160509 × $10^{-2}$ | −0.6088300 | 0.1498092 | 0.1198516 | 0.1481350 | 2.1438833 × $10^{-2}$ | 0.2809639 |

TABLE 1-continued

|  | 41 | $40_1$ | $40_2$ | $40_3$ | $40_4$ | $40_5$ | $44_1$ |
|---|---|---|---|---|---|---|---|
| $42_7$ | −0.2879083 | 4.535203 | 1.651245 | 0.1361696 | −0.9952433 | −2.165665 | 7.215369 |
| $42_8$ | −0.7957214 | −1.375939 | −1.649343 | −0.8138846 | 2.368909 | 3.270148 | 6.201508 |
| $42_9$ | −0.4451109 | −0.2926977 | −1.928688 | 0.4421443 | 1.399692 | $-4.0996075 \times 10^{-2}$ | 0.5186844 |
| $42_{10}$ | −0.415331 | 0.2126423 | −1.267643 | 0.4232530 | 0.1681028 | $-4.9120817 \times 10^{-2}$ | $9.2557922 \times 10^{-2}$ |
| $42_{11}$ | 0.4183943 | 6.255634 | 4.093575 | 0.1349258 | −4.039281 | −6.014577 | 2.164198 |
| $42_{12}$ | 0.2721712 | −1.467331 | −0.6635858 | −0.3251848 | 1.770344 | 2.405192 | −3.814010 |
| $42_{13}$ | −2.350469 | 6.183599 | 3.838307 | 2.002846 | −1.917678 | −5.259097 | −4.726597 |
| $42_{14}$ | −0.2583790 | −3.530308 | −2.822249 | $-5.2763898 \times 10^{-2}$ | 3.397974 | 4.521479 | −8.074098 |
| $42_{15}$ | −0.4502479 | −0.7444893 | −1.351589 | 0.2553025 | 1.500513 | −0.1743557 | 0.3979045 |
| 43 | — | — | — | — | — | — | −4.631011 |

TABLE 2

|  | 41 | $40_1$ | $40_2$ | $40_3$ | $40_4$ | $40_5$ | $44_1$ |
|---|---|---|---|---|---|---|---|
| $42_1$ | −4.193674 | 2.365072 | −6.145033 | −0.3585054 | −0.8656517 | −0.3169781 | 0.6214004 |
| $42_2$ | 1.191521 | −7.508436 | −3.591114 | 3.515102 | 7.926471 | 11.17513 | −1.265046 |
| $42_3$ | 1.762605 | −2.942649 | −2.911249 | 7.347221 | 5.244387 | 3.436846 | 0.3940509 |
| $42_4$ | −1.465728 | −5.480864 | −5.861592 | −0.7374088 | 2.281459 | 8.170863 | −1.529207 |
| $42_5$ | 0.1781127 | −8.986593 | −5.346720 | −0.8697257 | 9.398799 | 9.078117 | −1.457719 |
| $42_6$ | −4.724077 | −5.347132 | −9.728269 | 3.497491 | 4.656240 | 10.98184 | 0.8850412 |
| $42_7$ | −9.706168 | −6.827443 | −13.41621 | −0.7397503 | −9.778111 | 3.838732 | −0.4893694 |
| $42_8$ | −5.516407 | −6.862339 | −2.244147 | −2.101645 | 5.701811 | 3.207061 | 0.5853565 |
| $42_9$ | 4.666968 | −2.432001 | −6.446541 | 3.002667 | 8.263611 | 13.07758 | 0.3569175 |
| $42_{10}$ | −0.4630633 | −10.40785 | 2.823503 | 2.807030 | 7.513634 | 2.398431 | 0.5419101 |
| $42_{11}$ | −0.4032575 | −17.56822 | −2.895285 | 0.2708611 | 15.40102 | 14.69349 | 0.5243658 |
| $42_{12}$ | 0.6366476 | −5.204558 | 1.022199 | 3.674104 | 5.860373 | 6.279136 | −1.318392 |
| $42_{13}$ | 4.078143 | 5.303721 | 2.087557 | 1.094783 | 1.931870 | 1.642602 | −1.105209 |
| $42_{14}$ | −4.906148 | −5.341652 | −2.786296 | 1.537092 | 1.853248 | 10.33540 | −0.6807236 |
| $42_{15}$ | 6.771458 | 1.891379 | 3.611591 | −2.751590 | 2.961185 | 6.743467 | 1.235380 |
| 43 | — | — | — | — | — | — | 1.412543 |

TABLE 3

|  | 41 | $40_1$ | $40_2$ | $40_3$ | $40_4$ | $40_5$ | $40_6$ | $40_7$ | $40_8$ |
|---|---|---|---|---|---|---|---|---|---|
| $42_1$ | $3.8382355 \times 10^{-2}$ | −3.096940 | −1.260877 | 0.8845416 | 0.7635532 | −2.581388 | −1.612815 | 1.215086 | 3.310355 |
| $42_2$ | −0.3808101 | −0.4535248 | −1.227982 | −1.621543 | −1.951316 | −0.1523097 | −0.6281971 | −0.8157763 | −1.988472 |
| $42_3$ | −0.7986116 | 0.1016754 | −0.5955780 | −2.439312 | −3.719557 | 0.8934104 | 0.6159450 | 1.363785 | −3.153723 |
| $42_4$ | 0.1531805 | −1.733232 | −0.9326283 | −2.001596 | −1.510381 | −0.6112095 | −1.774953 | −0.9927989 | −2.207720 |
| $42_5$ | 0.1862210 | 0.9481991 | 0.4349670 | $-5.3779509 \times 10^{-2}$ | 0.3747145 | 1.544936 | −0.4354309 | 0.8274262 | −0.4725093 |
| $42_6$ | −0.4549730 | $3.4843713 \times 10^{-2}$ | 2.035006 | 3.475731 | 2.741328 | −1.355296 | 1.953589 | 1.330331 | 2.340163 |
| $42_7$ | 1.019091 | 1.665607 | $-4.9863037 \times 10^{-2}$ | −2.179640 | −2.251398 | 1.267533 | 1.261544 | −2.178160 | −3.328774 |
| $42_8$ | 0.4093578 | 0.1940718 | 1.433253 | 3.295487 | 2.674610 | −1.120219 | 0.2112611 | 1.591533 | 2.559684 |
| $42_9$ | −0.6496542 | 0.5302610 | −0.9630286 | −2.315833 | −2.631275 | 1.399073 | 0.3915772 | −2.488634 | −3.687866 |
| $42_{10}$ | −1.458370 | 0.2537026 | 0.9680573 | 1.998626 | 1.627725 | −1.864081 | 0.7671525 | 1.875464 | 4.067166 |
| $42_{11}$ | 0.1074826 | 1.705970 | 0.3888880 | 0.7984002 | 0.8097062 | 1.152762 | 0.5541150 | 0.6527650 | 0.2555155 |
| $42_{12}$ | 1.3040142 | −0.8479640 | 0.9567826 | 1.367363 | 0.9383634 | −1.225831 | −0.5634804 | 1.360180 | 2.922149 |
| $42_{13}$ | −1.506894 | 1.357726 | 1.122026 | 2.588949 | 2.255151 | −0.5151148 | 1.341114 | 1.362743 | 2.426229 |
| $42_{14}$ | −1.256415 | 3.572826 | 2.279480 | 0.9362966 | 0.4040238 | 2.739279 | 2.799824 | −0.6534312 | −1.755915 |
| $42_{15}$ | 0.5479261 | −3.653696 | −2.718803 | 0.9155704 | −0.1535155 | −3.206090 | −2.683963 | 0.7273700 | 1.920989 |
| 43 | — | — | — | — | — | — | — | — | — |

|  | $40_9$ | $40_{10}$ | $40_{11}$ | $40_{12}$ | $40_{13}$ | $40_{14}$ | $40_{15}$ |
|---|---|---|---|---|---|---|---|
| $42_1$ | −2.970917 | −0.4874895 | 1.720342 | 2.246602 | −0.7825614 | −1.323530 | 0.9547229 |
| $42_2$ | 0.9519125 | 1.118669 | −0.6062441 | −0.8233500 | 1.237398 | 1.448818 | 1.286103 |
| $42_3$ | 2.718867 | 2.466753 | −1.055725 | −1.763796 | 3.515976 | 2.971971 | 1.895888 |
| $42_4$ | −0.2499383 | 0.8697481 | −1.338377 | 0.7223290 | 0.5893444 | 0.4291540 | 1.028987 |
| $42_5$ | 0.4938367 | 0.1677299 | −0.4900165 | $-4.2397426 \times 10^{-3}$ | 0.5096724 | 0.3925769 | −0.3794613 |
| $42_6$ | $-9.7612798 \times 10^{-2}$ | −1.868370 | 0.4166625 | 0.1413654 | −3.202094 | −1.881542 | −1.281698 |
| $42_7$ | 3.708593 | 0.1639404 | −2.565010 | −3.293767 | −0.6073306 | 0.7263569 | −2.118973 |
| $42_8$ | −2.372371 | −1.361556 | 0.4843988 | 0.7160565 | −2.206575 | −2.660254 | −0.7980450 |
| $42_9$ | 3.271653 | 1.405289 | −0.3152692 | −1.790486 | 3.110291 | 2.806654 | 6.9335458 |
| $42_{10}$ | −1.945032 | −1.086817 | 1.588633 | 2.004315 | −3.974786 | −3.487001 | −0.7060963 |
| $42_{11}$ | 0.3833722 | −0.2555923 | 0.1055327 | 0.2960432 | −0.1669462 | 0.1272081 | −0.3178324 |
| $42_{12}$ | −2.635703 | −1.685682 | 0.3028783 | 1.496506 | −2.420505 | −2.871746 | −1.098776 |
| $42_{13}$ | −0.6586280 | −1.088249 | 1.162358 | 1.332530 | −0.1607005 | 0.3385191 | −0.2526796 |
| $42_{14}$ | 2.936188 | 0.7020659 | −2.084074 | −3.898886 | 0.6331311 | 0.9471766 | −2.479599 |
| $42_{15}$ | −3.184896 | −0.6604068 | 2.126057 | 4.326081 | −0.3036031 | −0.4895931 | 3.132718 |
| 43 | — | — | — | — | — | — | — |

TABLE 3-continued

|  | $40_{16}$ | $44_1$ | $44_2$ |
| --- | --- | --- | --- |
| $42_1$ | 2.315894 | −2.722712 | −5.385885 |
| $42_2$ | 0.8861766 | −3.970655 | 7.258379 |
| $42_3$ | 0.5959791 | −1.823796 | 1.737247 |
| $42_4$ | 0.4496366 | 5.264840 | −5.995713 |
| $42_5$ | $9.3591496 \times 10^{-2}$ | −4.308149 | 2.667742 |
| $42_6$ | −1.344219 | 0.3559556 | −1.497321 |
| $42_7$ | −2.258489 | −0.8985747 | −2.633842 |
| $42_8$ | −0.2214715 | 9.458448 | 3.618534 |
| $42_9$ | −0.4232267 | 2.489061 | 6.891394 |
| $42_{10}$ | 0.8760120 | 3.088189 | 1.763980 |
| $42_{11}$ | 0.2847479 | 8.999899 | −0.6468247 |
| $42_{12}$ | −0.4297979 | −7.857321 | 7.763845 |
| $42_{13}$ | 0.7345580 | −4.302462 | −0.8756973 |
| $42_{14}$ | −3.866666 | −3.211736 | −7.074350 |
| $42_{15}$ | 4.546144 | −2.708068 | −5.933221 |
| 43 | — | 0.7589712 | −1.997806 |

As examples of ways in which a network such as that seen in FIG. 3 may be "trained", there now follows a description of training a network to predict source positions when inputs to the artifical neural network are the outputs of idealised focal plane arrays. Two cases are described, namely a 5×1 focal plane array and an idealised 4×4 square focal plane. The 5×1 array is a linear array of 5 sensors, each with a sin(x)/x shape point spread function as given by $$h_i(\xi) = \frac{\sin[\Omega(x_i - \xi)]}{\pi(x_i - \xi)} \quad (6)$$

For $i = 1, \ldots n$
where $n = 5$ for $5 \times 1$ array
and $n = 16$ for $4 \times 4$ array.

for a horizontal 5 × 1 array, and $$h_i(\eta) = \frac{\sin[\Omega(x_i - \eta)]}{\pi(x_i - \eta)} \quad (7)$$

for a vertical 5×1 array, where $\Omega$ is the spatial bandwidth, $\xi$ is azimuth $\eta$ is elevation and $x_i$ is the position of the ith sensor in the focal plane. For each case of the linear array the sensor aperture is a narrow slit.

Figure 4:
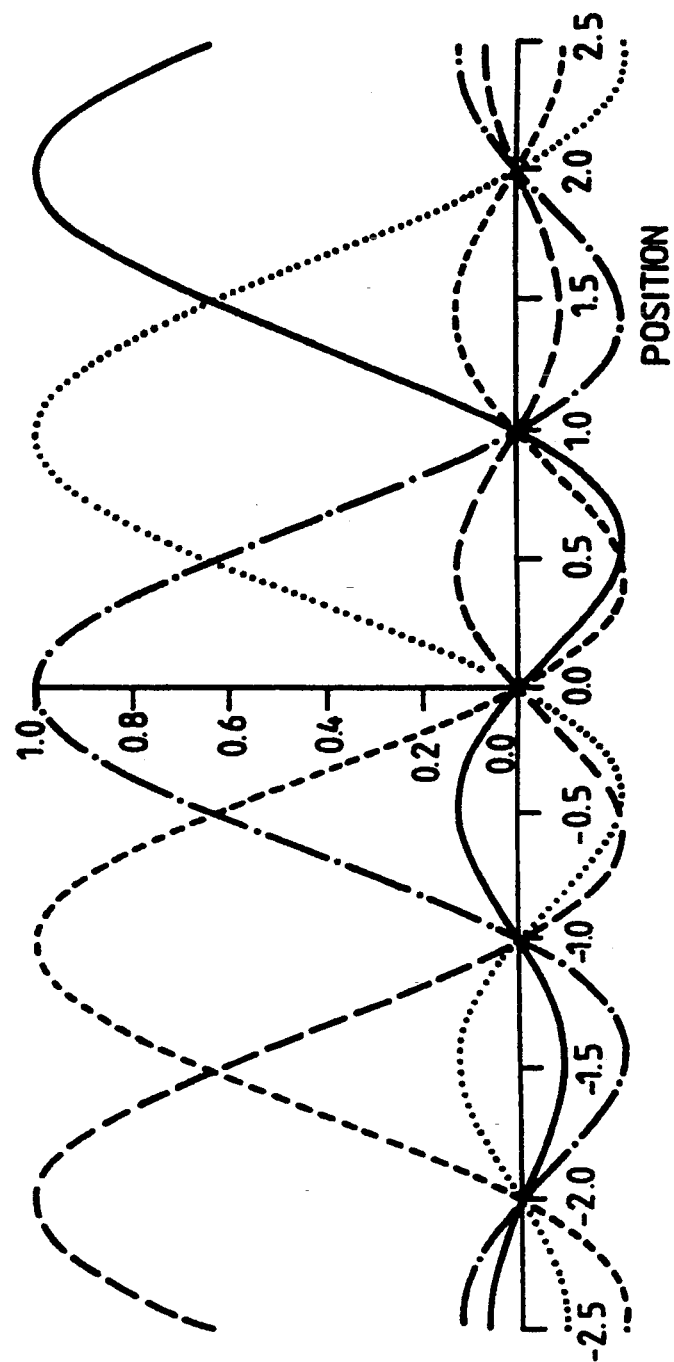
FIG. 4 is the response of each sensor of a 5×1 array to a point source in the far field.

FIG. 4 shows the response of each sensor of the 5×1 array to a point source in the far field as a function of the position of the point source (for a value $\Omega = \pi$). The x axis is divided into aribrary units such that full far field coverage is five units (i.e., the distance between adjacent sensors in the focal plane is unity). It can also be seen that use of unitary spacing gives the distance between the peak of a response and the first null (the beamwidth) as unity.

The 4×4 square array has 16 sensors, each with idealised point-spread function given by $$h_i(\xi, \eta) = \frac{\Omega J_1(\Omega r)}{2\pi r} \quad (8)$$

where $\Omega$ is the spatial bandwidth, $J_1$ is the Bessel function of the first kind of order 1 and $r = [(\xi - x_i)^2 + (\eta - y_i)^2]^{\frac{1}{2}}$ where $x_i$ and $y_i$ represent the position of the ith sensor in the focal plane array.

Where a value of $\Omega = \phi$ is taken for both the 4×4 and 5×1 arrays, and so sampling at the Nyquist rate (i.e. taking sensor outputs at the Nyquist rate) gives unit spacing of the sensor points.

Each of the array outputs is fed into an artificial neural network of the type seen in FIG. 3 (except that for the 5×1 array there is only one output node since we estimate one angular position). Each of the hidden layer nodes uses a nonlinear transfer function.

$$\phi(x) = \frac{1}{1 + e^{-x}} \quad (9)$$

The output node of the 5×1 array (for $\xi$ or $\eta$ dependent upon input data vector) and the output nodes of the 4×4 ($\xi$ and $\eta$) are linear functions of the input, and given by $$\phi(x) = x \quad (10)$$

The training of an artificial neural network involves using a set of training data to obtain the weights and biasses of the neural network set data. The following training sets vary only in the number of images used to characterise the point spread function. Each training set consists of a set of normalised (i.e. the magnitude of the image vector is unity) images of single point soruces as inputs to the artificial neural network, together with the source positions which are taken as the target data for the artifical neural network.

Figure 5:
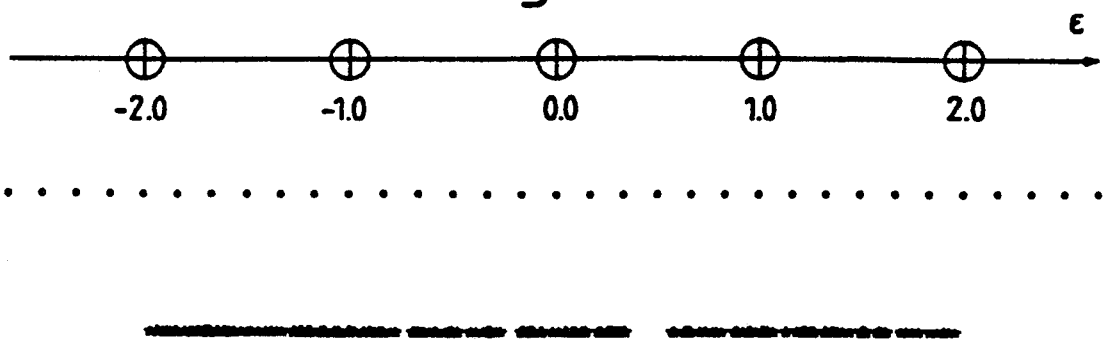
FIG. 5 is an example of calibration target positions for the training data, target positions for the test data and the sensor positions for a 5×1 array.

For the linear array, the training set comprises images of a single source calculated using equation 6 at positions equally spaced across the field of view of the array from −2.5 to 2.5 and at a spacing of 1/N. Thus, there are (5N+1) samples. For the test set, the normalised images of a single source at 200 positions chosen randomly between −2.0 and 2.0 are taken as inputs to the artificial neural network, with the source positions are point sources. These can be seen in FIG. 5 where the training data is shown as circles, the target positions for the test data are given as stars and the sensor positions are given as circled crosses. These positions are shown on separate axes for clarity. Three training sets are considered corresponding to values of N of 6, 10 and 20.

Figure 6:
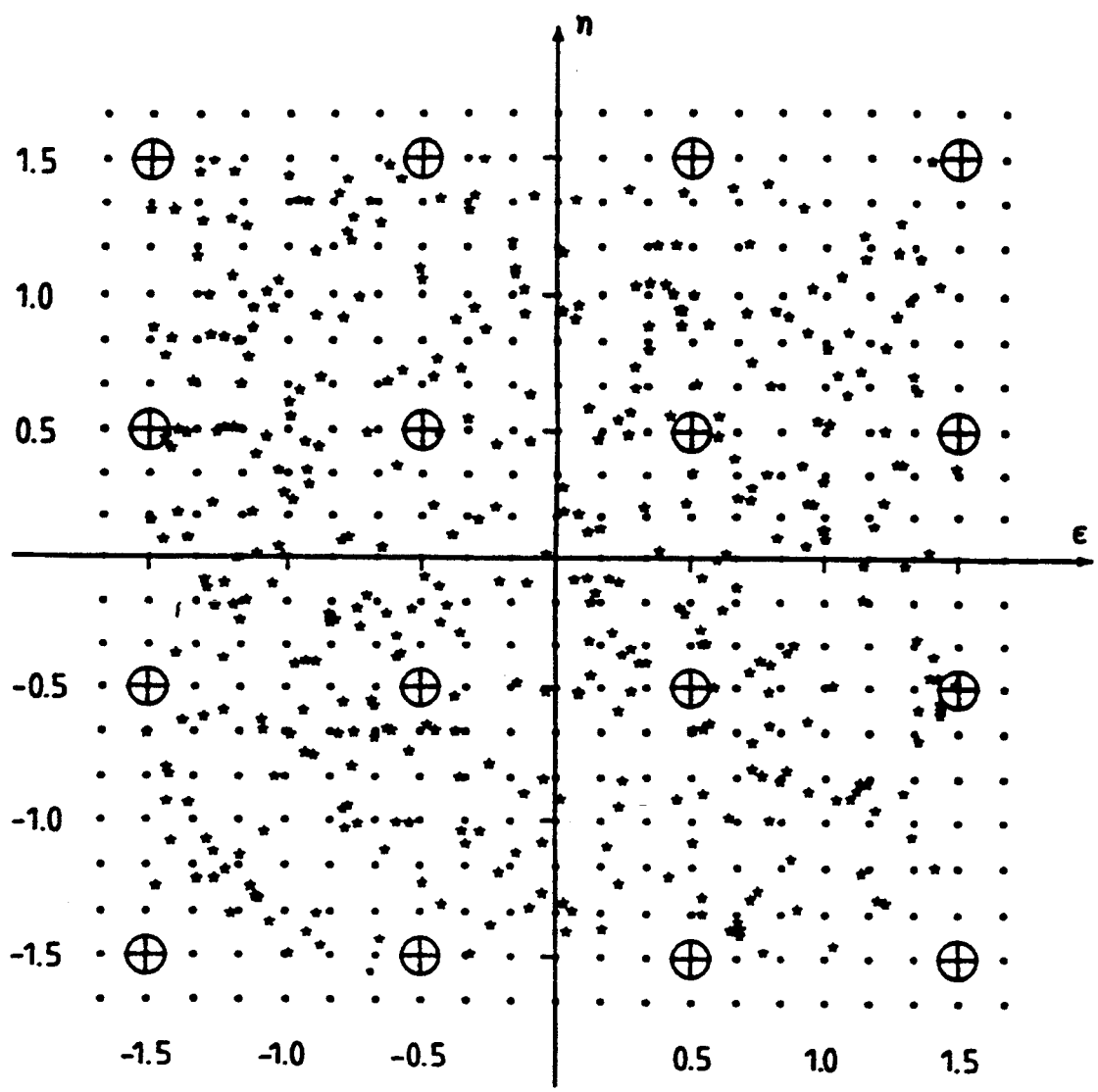
FIG. 6 is a demonstration of data as for FIG. 5, except for a 4×4 array.
Figure 8:
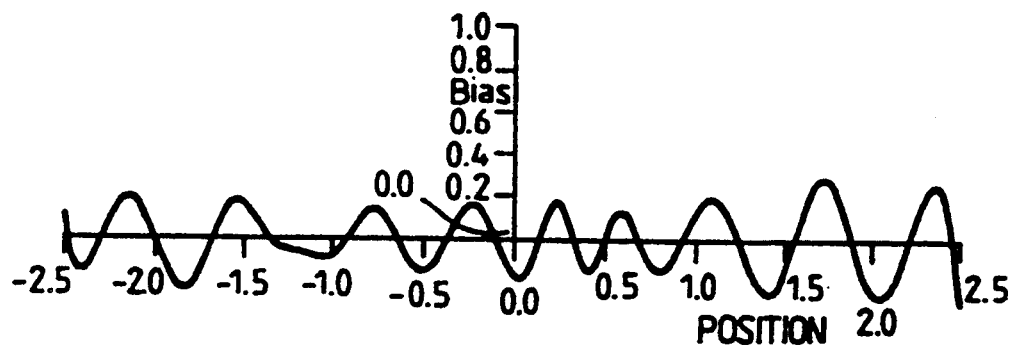
FIG. 8 is a graph of bias in position (×100) for a 5×1 array and 3 hidden layer nodes (101 training images).
Figure 9:
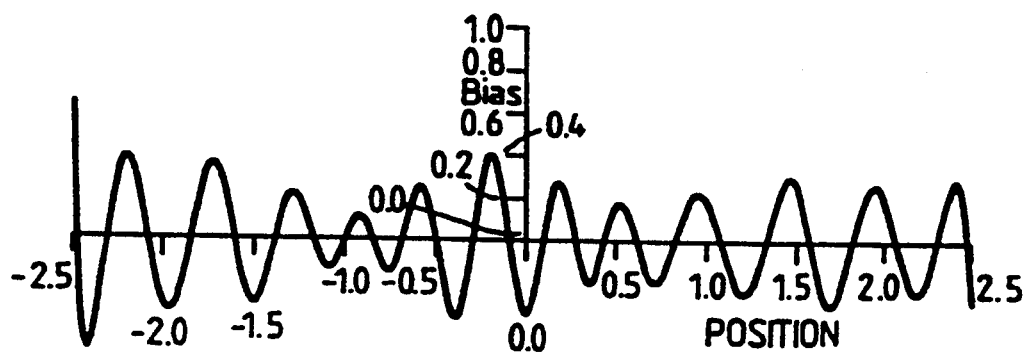
FIG. 9 is a graph of bias in position (×1000) for a 5×1 array and 5 hidden layer nodes (101 training images).
Figure 10:
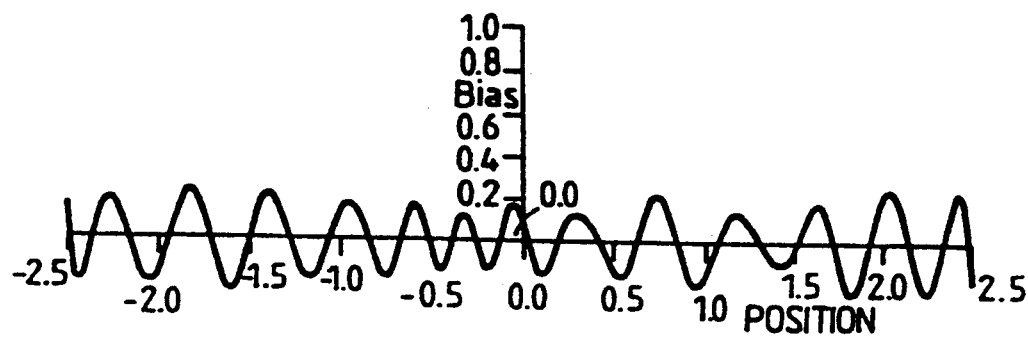
FIG. 10 is a graph of bias in position (×1000) for a 5×1 array and 10 hidden layer nodes (101 training images).

For the 4×4 square array, the input data comprises the normalised images of the source at positions which lie on a (3N+3)×(3N+3) grid covering the field of view of the array (where there are N image positions per sensor spacing). Only one training set with N=6 is described. FIG. 6 plots the positions of the 16 sensor points and, in the same coordinate system, the positions of the sources in the far field used for training and testing the network (for the case of N=6). The target data used for training are the ($\xi, \eta$) positions on the grid of the source which gives rise to the image. Thus, for the training phase, with N=6, there are 441 patterns of dimension 16 for the inputs and dimension 2 for the targets. For the test data, the normalised images of a single source at 400 ($\xi,\eta$) positions, chosen randomly over ±1.5 are taken as input with the positions as targets.

With the generation of test data carried out as described above, the selection of weights can be made.

For the linear array, the network is of the form 5-$n_o$-1 and for the square array the network configuration is 16-$n_o$-2, where $n_o$ is the number of hidden layer nodes. Several different values of $n_o$ will be described.

For a given value of $n_o$ and a given set of training data, the network can be trained using the following procedure. Initially, the values of the weights are chosen randomly from a uniform distribution on (−1.0, 1.0). Then the BFGS nonlinear optimisation strategy can be used to find the solution for the weights for which the mean square error between the actual output of the network and the desired output (target value) is a minimum. The network is tested using the test data generated and the normalised error on test calculated. For the linear array, the training is run for 100 different random start configurations for the weights. For the 4×4 array training is performed for only 10 random starts for the weight. This is due to the length of time taken to find a solution for the square array. The solution for the weights which gives the lowest normalized error on test over the 100 (10) experiments is chosen as the one which best describes the mapping from image space to position space for the type of artificial neural network under consideration.

Tables 4 to 6 gives the results of training a network for a linear 5×1 array for each of three training sets (N=6, 10, 20). Each table gives the average number (over the 100 experiments) of function mean square (error evaluation) and gradient (derivative of the error with respect to all the weights) calls taken to find a minimum of the error, the means normalized error on test over the 100 solutions and the best (i.e. the lowest) normalized error for several values of $n_o$, the number of hidden nodes. An error of 0.015 corresponds to an rms bias of approximately 1/58 of the spacing between sensors in the focal plane (i.e. 1/58th of beamwidth).

Table 4 gives results for a training set with 6 data points per sensor spacing. That is, the set of training data comprises images of sources calculated for the sources at positions which are equally spaced with a spacing of 1/6 of the distance between sensors in the focal plane. The lowest means error on test (of 0.00050) is achieved by the network with the largest number of hidden layer nodes ($n_o$=15). The lowest single normalized error over all 100 experiments is also obtained by the network with 15 hidden layer nodes. The table also shows that both the mean and the lowest errors decrease as the number of hidden nodes increases. There is a significant increase in performance in moving from 2 to 3 hidden nodes. The mean normalized error decreases by a factor of 5.

| $n_o$ | 2 | 3 | 5 | 10 | 15 |
| --- | --- | --- | --- | --- | --- |
| Fn | 1137 | 1335 | 1324 | 1096 | 995 |
| Grad | 221 | 265 | 268 | 223 | 202 |
| mean error | 0.01853 | 0.00389 | 0.00110 | 0.00059 | 0.00050 |
| lowest error | 0.01103 | 0.00142 | 0.00025 | 0.00023 | 0.00019 |
| Number correct | 16 | 99 | 100 | 100 | 100 |

$n_o$ = number of hidden layer nodes
Fn = average number of function calls
Grad = average number of gradient calls
mean error = mean normalised error on the test data
lowest error = lowest normalised error on the test data.

Table 4. Results table illustrating the performance of the BFGS search strategy on the linear array for training data consisting of 6 image points per sensor spacing.

| $n_o$ | 2 | 3 | 5 | 10 | 15 |
| --- | --- | --- | --- | --- | --- |
| Fn | 1091 | 1314 | 1521 | 1191 | 1029 |
| Grad | 212 | 262 | 309 | 243 | 214 |
| mean error | 0.0249 | 0.00326 | 0.00093 | 0.00042 | 0.00039 |
| lowest error | 0.0102 | 0.00113 | 0.00029 | 0.00010 | 0.00019 |
| Number correct | 20 | 99 | 100 | 100 | 100 |

$n_o$ = number of hidden layer nodes
Fn = average number of function calls
Grad = average number of gradient calls
mean error = mean normalised error on the test data
lowest error = lowest normalised error on the test data Table 5. Results table illustrating the performance of the BFGS search strategy on the linear array for training data with 10 image points per sensor spacing.

| $n_o$ | 2 | 3 | 5 | 10 | 15 |
| --- | --- | --- | --- | --- | --- |
| Fn | 1132 | 1467 | 1657 | 1285 | 1117 |
| Grad | 220 | 293 | 337 | 263 | 228 |
| mean error | 0.01853 | 0.00277 | 0.00037 | 0.00033 | 0.00028 |
| lowest error | 0.01119 | 0.00104 | 0.00017 | 0.00011 | $6.7 \times 10^{-5}$ |
| Number correct | 30 | 100 | 100 | 100 | 100 |

$n_o$ = number of hidden layer nodes
Fn = average number of function calls
Grad = average number of gradient calls
mean error = mean normalised error on the test data
lowest error = lowest normalised error on the test data Table 6. Results table illustrating the performance of the BFGS search strategy on the linear array for training data with 20 image points per sensor spacing.

Using more data for training (10 source positions per sensor spacing) decreases the lowest single error on test as shown in Table 5. The mean error is decreased for all networks except the one with two hidden layer nodes. The smallest mean error occurs for a network with 15 hidden layer nodes, whilst the smallest single error over the 100 experiments is for the network with 10 hidden layer nodes.

Increasing the amount of training data further (by a factor of two to give 20 source positions per sensor spacing) reduces the mean error on test for all examples except the mean error for the network with 2 hidden layer nodes, which is not improved compared to that in Table 4. The smallest mean error of 0.00028 is achieved by a network with 15 hidden layer nodes. The lowest single value of $6.7 \times 10^{-5}$ corresponds to a root-mean-square bias over the test set of $7.7 \times 10^{-5}$ of a "beamwidth" (the sensor spacing in the focal plane).

There are several conclusions that can be drawn from these three tables. Firstly, the greater is the number of hidden layer nodes, then the smaller is the error on the test set (up to a network with 15 hidden layer nodes). This shows that a network with more parameters is better able to model the transformation from image space to position space. However, a network with 30 hidden layer nodes has been trained and this gives performance very similar to the results given for the network with 15 hidden layer nodes. Training of a network with, for example, 100 hidden layer nodes will require a different optimisation procedure than the BFGS method (due to the large number of parameters) and any differences in performance which arise may be due to the optimisation strategy rather than the network size. A second trend indicated by the tables is that increasing the size of the training set results in a smaller error on test, for the sizes of data set considered and provided there are more than 2 hidden layer nodes.

| $n_o$ | 3 | 6 | 9 | 12 | 15 |
|---|---|---|---|---|---|
| Fn | 2306 | 6201 | 8541 | 7775 | 7284 |
| Grad | 515 | 1494 | 2090 | 1908 | 1788 |
| mean error | 0.029405 | 0.00496 | 0.00204 | 0.00101 | 0.00058 |
| lowest error | 0.01123 | 0.00296 | 0.00168 | 0.00082 | 0.00048 |
| Number correct | 2 | 10 | 10 | 10 | 10 |

$n_o$ = number of hidden layer nodes
Fn = average number of function calls
Grad = average number of gradient calls
mean error = mean normalised error on the test data
lowest error = lowest normalised error on the test data Table 7. Results table illustrating the performance of the BFGS search strategy on the square array for training data with 6 image points per sensor spacing.

For the square array, only one data set (N=6) is described. Results are given in Table 7 for several values of $n_o$, the number of hidden layer nodes. The Table shows that the normalised error on test decreases as the number of hidden layer nodes increases. The number correct is the number of solutions with a normalised error on test of less than 0.015, which corresponds to a root-mean-square bias of 0.018, approximately 1/55 of a beamwidth, or 1/9 of the grid spacing. It is expected that a network employing a greater number of hidden layer nodes would give still smaller errors on test.

For a given solution for the weights, the bias in the estimate of the position of a single source is found by calculating the image of the point source and then using the trained network to estimate the position from the image. The bias is the difference between the position of the point source and the estimated position.

Figure 7:
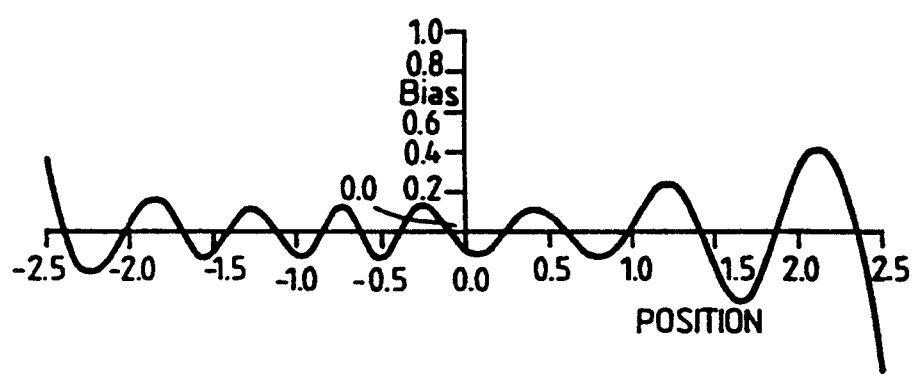
FIG. 7 is a graph of bias in position (×10) for a 5×1 array and 2 hidden layer nodes (101 training images).

For the linear array, the bias is calculated as a function of position for an artificial neural network trained on the data set comprising images of point sources spaced at 1/20 of a sensor spacing. FIGS. 7 to 11 plot the bias as a function of angular position for several trained artificial neural networks, each with a different number of hidden layer nodes. All the figures show an oscillatory behaviour for the bias. For an artificial neural network with two hidden layer nodes, the solution of the training procedure for the weights, which gives the lowest error on the test set, produces a bias which is periodic with 7 periods across the field of view of the array (−25 to 2.5) (FIG. 7). For a network with three hidden layer nodes, the peak of the oscillations is reduced (thus giving a lower mean error) and the period is increased to 10 cycles across the field of view. For five hidden layer nodes, the best solution has 13 cycles across the field of view. The best solution for networks with ten and fifteen hidden layer nodes also produces a bias with 13 cycles, but the peak of the cycles is lower than that obtained with five hidden layer nodes.

Figure 12:
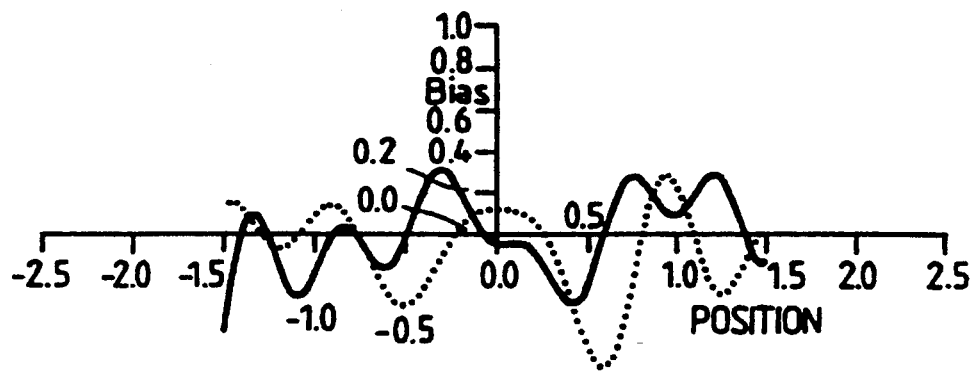
FIG. 12 is a graph of bias in azimuth, ξ(solid line) and elevation, η (dashed line) directions (×500) for a 4×4 array and 15 hidden layer nodes (441 training images), where η=0.0.
Figure 13:
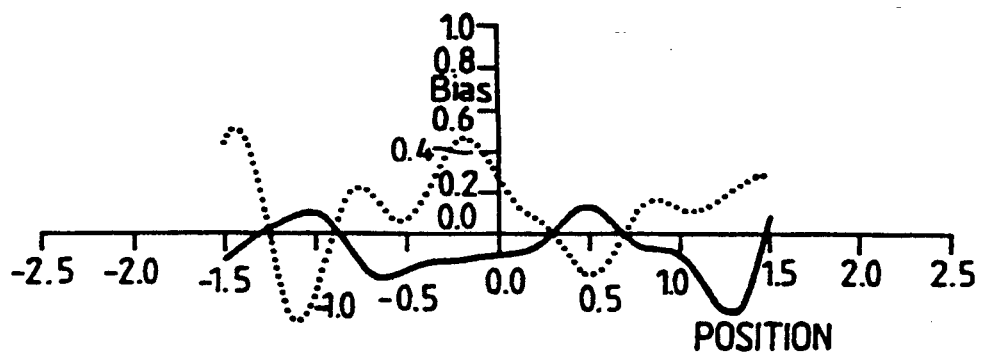
FIG. 13 is a graph of bias in ξ (solid line) and η (dashed line) (×500) for a 4×4 array and 15 hidden layer nodes (441 training images), where η=1.0.

For the square array, the bias in the $\xi$ and $\eta$ directions has been calculated as a function of $\xi$ for two selected values of $\eta$. This is illustrated in FIGS. 12 and 13. FIG. 12 plots the bias across the centre of the array ($\eta=0$) and FIG. 13 plots the bias along a line midway between the top two rows of receiving elements ($\eta=1$). As in the linear example, because of the asymmetry in the solution for the weights, the bias is asymmetric, and is also oscillatory.

As described above it can be shown that it is possible to construct an artificial network to perform a mapping from image space to angular position for idealised linear and square focal-plane arrays which gives a very small angular error. For example, in the linear array example, a peak angular error across the field of view of $2.0 \times 10^{-4}$ can be achieved with a network having 15 hidden layer units and trained on 101 patterns (see FIG. 11).

However, it is also possible to evaluate the effects of noise on the image. In many practical situations, the measured image will be corrupted by noise. This may have an extraneous origin or be due to thermal noise effects arising from receiver components. In the following analysis noise is added to the image vector prior to normalisation and subsequent input to the artificial neural network and the effects that the noise produces on the estimated position of the source are described.

Of course, noise is always present, even in the training data. However, it can be assumed that the effects of noise on the normalised images in the training data can substantially be removed by performing some form of integration or filtering.

It is possible to train on image vectors representative of the environment in which a sensor operates. That is, to train on noisy image vectors and minimise the errors due to bias and noise simultaneously. This is described after the following analysis.

The subsequent analysis evaluates the expected error in the output (the expected error on the angular position) as a function of the network weights and the non-linear transfer function of the hidden layer nodes in a high signal-to-noise ratio approximation. There are four parts to the analysis. The first part evaluates the perturbation to the normalised image given a perturbation due to noise of the original unnormalised image. Secondly, the outputs of the hidden layer nodes are derived. The next stage is to calculate the outputs of the artificial neural networks. Finally, an expression for the expected error is obtained.

Let the vector I be the image of a single point source. In the absence of noise, the position of the source is estimated by a feed-forward network by taking as input to the network the normalised image vector, Î, given by $$\hat{I} = \frac{I}{\|I\|} \quad (11)$$

where $|I|$ is the $L_2$ norm of vector I.

If noise is present, then the image vector is the sum of two terms, I+x, where I is the image of the source in the absence of noise and x is a vector of noise samples. The input to the network is $\hat{I}_x$, given by $$\hat{I}_x = \frac{I+x}{\|I+x\|} \quad (12)$$

In the situation where $|x|/|I| \ll 1$ (a high signal-to-noise ratio) Equation 12 may be expanded to give $$\hat{I}_x = \hat{I} + \hat{x}^* - (\hat{x} \cdot \hat{I})\hat{I} \quad (13)$$

to first order in terms involving x. In Equation 13 the vector x is defined as $$\hat{x} = \frac{x}{\|I\|} \quad (14)$$

Thus, the input to the network is the original normalised image, I, plus a perturbation term, P, $$P = (1_n - \hat{I}\hat{I}^*)\hat{x}, \quad (15)$$

where $1_n$ is the n×n identity matrix. The perturbation vector P is the component of x orthogonal to the normalised image vector I.

Now, we calculate the outputs of the hidden units. Let u be the vector of hidden outputs, $u = (\phi_1, \phi_2, \ldots \phi_m)^*$, with the jth component, $\phi_j$, given by $$\phi_j = \phi(\mu_{oj} + \mu^* I_j)x \quad (16)$$

where $\phi$ is the nonlinear transfer function (assumed identical for all hidden units), $\mu_j$ is the vector of n scalar values associated with hidden node j and $\mu_{oj}$ is the bias. Assuming that the function $\phi$ is differentiable, then using Taylor's theorem and expanding to first order gives $$u = u_o + u_x \quad (17)$$

where $u_o$ is a vector of hidden layer node outputs in the absence of noise, with jth component $$\phi_{oj} = \phi(\phi_{oj} + \mu_j^* \hat{I}_j) \quad (18)$$

and $u_x$ is the vector of perturbations due to noise, with jth component $$\phi_{xj} = \frac{\partial \phi(\theta)}{\partial \theta} \mu_j^* P \quad (19)$$

where the derivative is evaluated at $\theta = \theta_j$, with $$\theta_j = \mu_{oj} + \mu_j^* \hat{I}. \quad (20)$$

Equation 19 may be written in matrix notation as $$u_x = GW^*P, \quad (21)$$

where G is a m×m diagonal matrix with $$G_{ii} = \frac{\partial \phi(\theta)}{\partial \theta} \quad (22)$$

evaluated at $\theta = \mu_{oi} + \mu_i^* I$, and W is a n×m weights matrix, whose columns are the weight vectors $\mu_i$.

Equation 21 represent the perturbation to the output of the hidden layer nodes due to noise on the image vector in a high signal-to-noise ratio approximation (so that truncation of the Taylor series expansion to first order is valid). We are now in a position to calculate the error at the output of the network. For a linear transfer function on the outputs, the output from the kth output node is $$O_k = \lambda_{ok} + \lambda_k^* u \quad (23)$$

and substituting for u from Equation 17 gives $$O_k = \lambda_{43k} + \lambda_k^*(u_O + u_x) \quad (24)$$
$$= O_{43k} + O_{xk}$$

where $O_{43k} = I_{43k} + I_k^* u_{43}$, is the output in the absence of noise and $I_{xk}$ is the perturbation to the kth output due to noise. Using Equation 21, the perturbation to the output vector may be written $$O_x = \Lambda^* GW^* P, \quad (25)$$

where $\Lambda$ is a m x n' array whose columns are the weight vectors $\lambda_k$. Equation 25 is the error in the output (i.e. the error in the estimate of position) due to noise added to the image vector. For a linear array, $O^x$ is a scalar (since n' = 1) and for the square array $O_x$ (i.e. is a vector of dimension 2. Equation 25 shows that the error is a linear combination of the perturbation vector elements.

It is appropriate here to give an interpretation of the matrix $\Lambda^* GW^*$. The (i,j)th element of this matrix is given by $$(\Lambda^* GW^*)_{ij} = \sum_{k=1}^{m} \lambda_{jk} \frac{\partial \phi_k}{\partial \theta} \mu_{ij}, \quad (26)$$

where the derivative is evaluated at $\theta = \theta_k$, the value of the input to the kth hidden unit. This expression is the derivative of the ith output with respect to the jth input for the given input pattern. Therefore, the elements of the matrix represent the sensitivity of the outputs to changes in the components of a particular input pattern.

Finally, we calculate the expected square error at the output. The expected value of the square error is given by $$\langle O_x^* O_x \rangle = \langle P^* WG^* \Lambda \Lambda^* GW^* P \rangle, \quad (27)$$

and substituting for P from Equation 15 gives $$\langle O_x^* O_x \rangle = \langle \hat{x} Z Z^* \hat{x} \rangle, \quad (28)$$

where Z is an n x m matrix $$Z = (1_n - \hat{I}\hat{I}^*) WG^* \Lambda \quad (29)$$
$$= \tilde{W} G^* \Lambda,$$

with the matrix $\tilde{W}$ defined to be the matrix whose columns are the components of the weights vector $\mu_j$ orthogonal to the image vector, I.

Writing Equation 28 explicitly as a summation gives $$\langle (O_x^* O_x) \rangle = \left\langle \left[ \sum_{i=1}^{n} \sum_{k=1}^{m} \sum_{l=1}^{n} \hat{x}_i Z_{ik} Z_{lk} \hat{x}_l \right] \right\rangle \quad (30)$$

and taking the angle brackets inside the summation and recordering the product gives $$\langle (O_x^* O_x) \rangle = \sum_{i=1}^{n} \sum_{k=1}^{m} \sum_{l=1}^{n} Z_{ik} \langle \hat{x}_i \hat{x}_l \rangle Z_{lk}, \quad (31)$$

which is the sum of the diagonal elements, or the trace of matrix $Z^*(xx^*)Z$, i.e.

$$(O_x^* O_x) = Tr(Z^*(xx^*)Z), \quad (32)$$

where Tr denotes the matrix trace operation. This equation expresses the expected square error at the output due to noise on the input as a function of the network parameters, the input pattern and the noise convariance matrix, (xx*).

If the noise is uncorrelated between different receiver sensors and of equal power in each channel (so that $<x_i x_j> = 0$, $i \neq j$, and $(x_i x_i) = \sigma^2$) then the noise covariance matrix, (xx*), is diagonal and the expected value of the square error is $$<O_x^* O_x> = \sum_{i=1}^{n} \sum_{k=1}^{n'} Z_{ik}^2 \sigma^2. \quad (33)$$

Substituting for Z, Equation 33 becomes $$<O_x^* O_x> = ||A^* G \widetilde{W}^*||^2 \sigma^2. \quad (34)$$

Equation 33 is the principal result of this section. It expresses the expected square error at the output of the network (the expected square error in angular position) due to noise on the image as a function of the artificial neural network parameters, the nonlinear transfer function, the noise value and the source position. The equation valid provided that the perturbation of the original image is small compared to the image. The quantity $\sigma^2$ is inversely proportional to the signal-to-noise ratio. More precisely, it is the noise power in a receiver channel divided by the square of the magnitude of the image vector. The magnitude of the image is proportional to the source amplitude and varies with source position. The elements of the diagonal of the matrix G for the logistic transfer function, $\phi(x) = 1/(1+e^{-x})$ are given by $$G_{ii} = \phi(\mu_{oj} + \mu_i^* \hat{I})(1 - \phi(\mu_{oj} + \mu_i^* \hat{I})). \quad (35)$$

Having evaluated the error due to noise, we may calculate the total error at the output of the network due to noise on the input. For a noisy image, $I_x$, of a single source at position T', presented at the input, the square error at the output (the square error in position) is $$||T - O||^{2'} \quad (36)$$

where O is the output (the estimate of the position) of the network for input $I_x$. In the high signal-to-noise ratio approximation, this may be written as $$||T - (O_o + O_x)||^2, \quad (37)$$

where $O_x$ is given by Equation 25. For a perturbation with zero mean (so that $<P> = 0$), the expected square error is $$||T - O_o||^2 + <O_x^* O_x>. \quad (38)$$

This gives the expected total square error in position for a source at position T'. Both terms in the above expression are a function of source position. The first term is the square of the bias error and the second term is the expected square error due to noise. Therefore, the accuracy of the position estimate is a function of position. A single performance measure may be obtained by averaging the expression (38) over all source positions for which the artificial neural network is expected to operate. The average of this error (over all possible positions of the source) may be approximated by summing over the training set (provided that the training set covers the field of view uniformly). This gives $$\frac{1}{P} \sum_{p=1}^{P} ||T^p - O_o^p||^2 + \frac{1}{P} \sum_{p=1}^{P} ||A^* G_p \widetilde{W}^*||^2 \sigma^2. \quad (39)$$

where Equation 34 has been used to substitute for $(O_x^* O_x)$. This is the average of the expected square error in position. The first term is the mean square error at the output for the uncorrupted training data. This is the quantity minimized by the training procedure. The second term is the average (over the field of view) of the expected square error due to noise.

A common way of expressing the error in position due to noise is as the root of the expected square error in position, $\xi$, in an equation of the form $$\epsilon = \frac{\theta_B}{K(snr)^{\frac{1}{2}}} \quad (40)$$

where $\theta_B$ is the (radar) beamwidth, K is the constant of proportionally and snr is the signal-to-noise ratio. For the linear and square array the beamwidth (defined to be the spacing between the peak and first null of the point-spread function) is unity, $\theta_B = 1$, and defining the signal-to-noise ratio to the noise power in a channel divided by the square of the amplitude of the source rather than the modulus squared of the image (and so giving a definition which is independent of source position), then we have from Equations 33 and 40 and the definition of x (14)

$$K = \frac{||I_1||}{||A^* G W^*||}, \quad (41)$$

where $I_1$ is the image of a source of unit amplitude at the same position at which the denominator is evaluated. The significance of the factor K in Equation 40 is that it is a measure of the performance of the array and network which is independent of the beamwidth and the signal-to-noise ratio (though Equation 40 is valid only in a high signal-to-noise ratio approximation). The larger the value of K, then the smaller is the angular error for a fixed signal-to-noise ratio.

Figure 11:
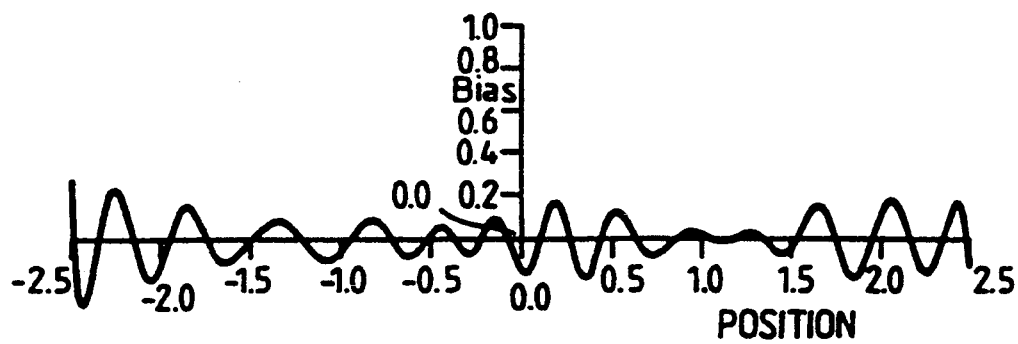
FIG. 11 is a graph of bias in position (×1000) for a 5×1 array and 15 hidden layer nodes (101 training images).
Figure 14:
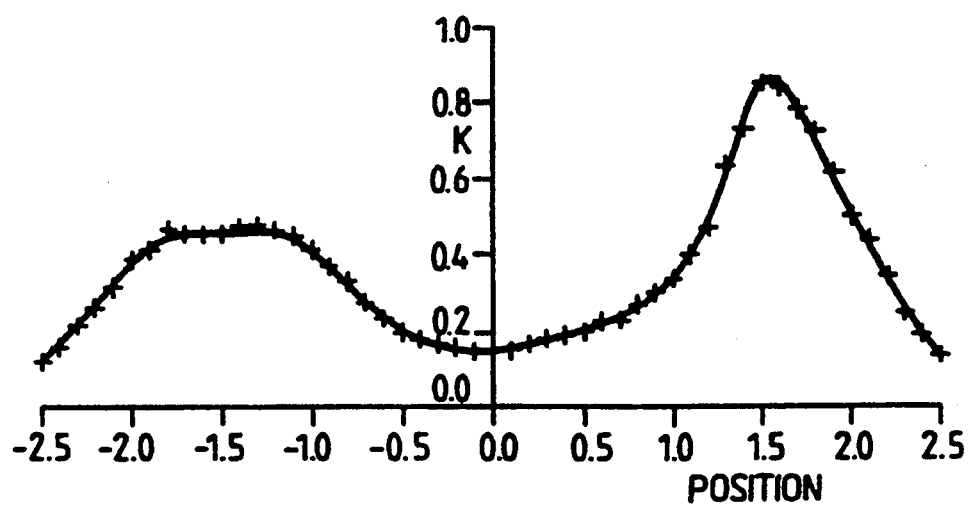
FIG. 14 is a graph of quantity K as a function of position for a (5×1) array, for an artifical neural network with 15 hidden layer nodes and trained on 101 sample patterns.

FIG. 14 plots the quantity K as a function of source position for the linear array and a trained network with 15 hidden layer nodes using the same solution for the weights which was used to generate the bias in FIG. 11. The figure shows that K varies between 0.15 and 0.85 across the array and the variation is not symmetrical, with the better performance (larger K) at positive positions. A value of K of 0.15 gives the root of the expected square error due to noise as 0.21 (in beamwidth units) for a signal-to-noise ratio of $10^3$ using Equation 40. A value of 0.85 for K gives an error of $3.7 \times 10^{-2}$. Averaging the expected square error due to noise across the field of view of the array (from $-2.0$ to $2.0$) and taking the square root results in a root mean expected square error of 0.12 for a signal-to-noise ratio of $10^3$. These values compare with a root mean square bias in position (mean across the field of view) of $7.77 \times 10^{-5}$ for the 15 sensor array trained on 101 samples (see FIG. 11). Thus the error due to noise is substantially greater than that due to the bias at this signal-to-noise ratio. At much greater signal-to-noise ratios, the bias error will begin to dominate.

Also plotted in FIG. 14 are the results of a Monte-Carlo simulation. For a given image of a point source at a known position, a noise vector is generated and added to the image vector. The elements of the noise vector are generated from a Gaussian distribution of zero mean and known variance. The resultant vector is then normalised and then presented as input to the trained network. The error at the output of the artificial neural network due to the noise is calculated. This procedure is repeated for 1000 different noise vectors for each image vector. The root of the expected square error in position $\xi_{estm}$ is estimated by taking the rook of the average square error over the 1000 samples. The estimated value of K, $K_{estm}$, is obtained from $$K_{estm} = \frac{1}{\xi_{estm}(snr)^{\frac{1}{2}}} \quad (42)$$

and is plotted in the figure. A value of $10^3$ was used for snr. The figure shows that the experimental results agree with the theoretical prediction. This means that the expansion of the nonlinearity as a Taylor series to first order is a good approximation for this particular solution for the weights and at this signal-to-noise ratio.

The previous analysis shows the effects of noise on an image vector for a trained artificial neural network. It was shown that the error in position due to noise on an input image vector depends on the product of three matrices (see Equation 33) which individually relate to the weights between the input layer and hidden layer, the derivatives of the nonlinearities of the hidden layer, and the weights between the hidden layer and the output layer. Collectively, this product describes the sensitivity of the outputs to the components of the input images. The results given above for the factor K were derived for a network trained on uncorrupted image vectors (i.e. images of point soruces with no noise present). These results are rather poor compared with conventional pattern-matching techniques.

However, it may be expected that better performance could be achieved by training on image vectors representative of the environment in which the array will operate. In this situation, the training data would comprise a set of representative vectors for each source position in the scene, rather than a single image vector for each position. This increases the amount of training data.

The vectors within each set differ from one another due to noise effects. Minimising the mean-square error at the output of the network for such an enlarged data set will minimise the total error in position (the sum of the bias and noise errors).

In practice, the specific environment in which a system operates may be unknown. It is likely that the system will be expected to operate over a range of signal-to-noise ratios. Therefore the network must be trained on data representative of several signal-to-noise ratios. For a particular signal-to-noise ratio, it can be shown that training on noisy data with the conventional mean-square error criterion results in a smaller generalisation error (a smaller error in position on unseen data from the same distribution) than the error that would be obtained if uncorrupted data had been used for training. Thus, better performance may be achieved by training on noisy data, albeit at the expense of an enlarged training set.

However, it can also show that training on noisy data with the conventional mean-square error criterion (in order to minimize the total error at the output) is equivalent (in a high signal-to-noise ratio environment so that the Taylor series expansion of the above) to training on uncorrupted data with a different error criterion rather than in an expanded data set.

These two results together state that improved performance may be achieved by using uncorrupted training data and an error criterion composed of the conventional square error and an additional term which depends on the environment. In order to illustrate this result, a network with 15 hidden layer nodes can be trained on the data for a five sensor linear array. The network can be trained to minimise the augmented error assuming a signal-to-noise ratio of 1000. This is equivalent to training on noisy data with this signal-to-noise ratio and using the conventional mean-square error criterion at the output. The best solution for the weights (the one with the smallest normalised error on test over 100 experiments) is then used and FIGS. 15 and 16 plot the bias and the factor K.

Figure 15:
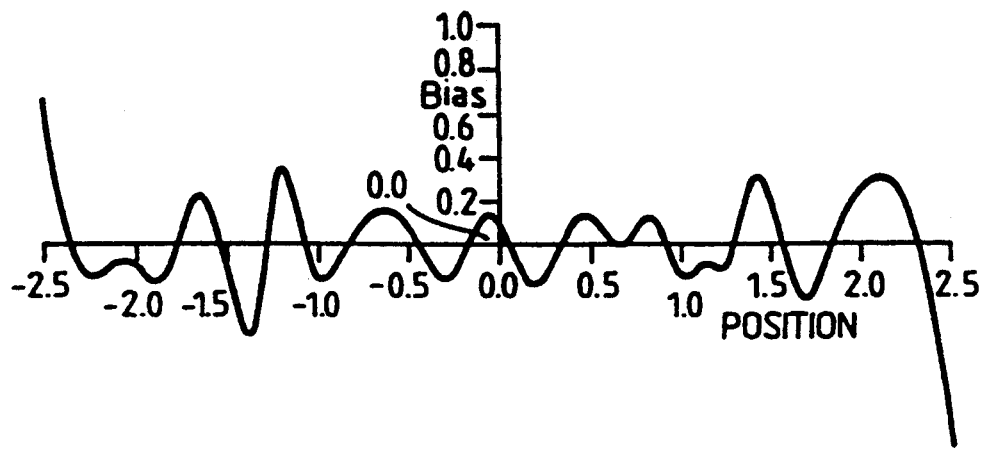
FIG. 15 is a graph of bias in position (x10) for an artificial neural network with 15 hidden layer nodes trained on 101 images and using an augmented error criterion with signal-to-noise ratio of $10^3$.

FIG. 15 shows that the bias in position is much greater in this case compared with a network trained with the standard square error criterion (see FIG. 11). The root mean square bias error is $1.814 \times 10^{-2}$, compared with $7.76 \times 10^{-5}$ in FIG. 14. Therefore, at high signal-to-noise ratios when the bias term dominates the noise error, the error in position will be larger for this network than for a network trained on uncorrupted data with the conventional mean-square error.

Figure 16:
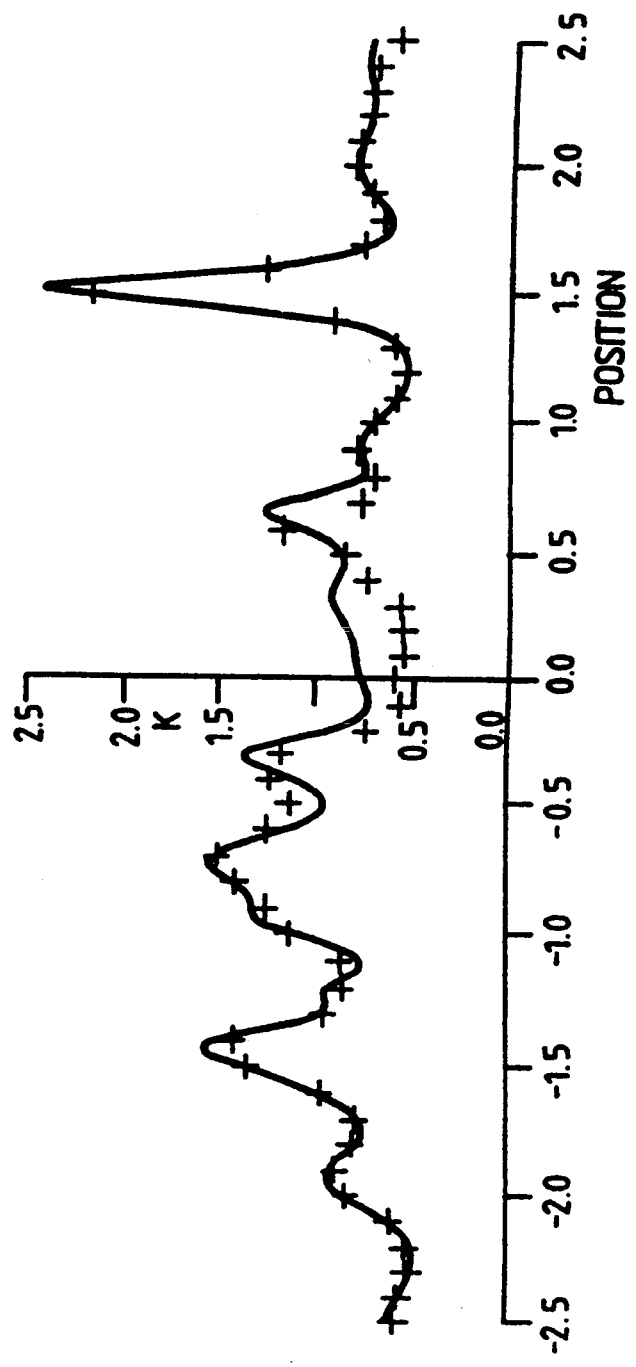
FIG. 16 is a graph of quantity K as a function of position for an artificial neural network with 15 hidden layer nodes trained on 101 images and uses an augmented error criterion with signal-to-noise ratio of $10^3$.

FIG. 16 plots the factor K, evaluated using Equation 41' and the solution for the weights. The crosses again denote estimated values obtained from a simulation using noisy vectors as input to the artificial neural network and evaluating the error. The error due to noise is smaller for an artificial neural network trained with the augmented error than for an artificial neural network trained with the conventional square error. Comparing FIGS. 14 and 16, we see that training with the augmented error has resulted in a larger value of the factor K which corresponds to a smaller noise error. Training on noisy data gives a root of the mean (averaged across the field of view) expected square error due to noise of $2.713 \times 10^{-2}$ on the test set for a signal-to-noise ratio of 1000. Training on uncorrupted data and testing on noisy data at the same signal-to-noise ratio gives an error of 0.12. Note that there is a small region near the centre of the array where the results of the Monte Carlo simulation differ from the theoretical prediction. This is because Equation 40 does not provide a good approximation to the error at this signal-to-noise ratios and for images of sources at these positions. Closer agreement between theoretical and experimental results is achieved at a higher signal-to-noise ratio.

I claim:
1. Radar apparatus of multiple outputs comprising:
an array of independent radar receiving sensor elements, each element for providing an output,
signal processing means for providing image information in the form of data vectors which are dependent on the element outputs,
means for calculating a position vector from the image information wherein said calculating means comprises an adaptive feed forward artificial neural network, said network comprising an input layer of nodes, at least one hidden layer of nodes and an output layer of nodes.

2. Radar apparatus as claimed in claim 1 where the adaptive feed forward artificial neural network has one hidden layer of nodes.

3. Radar apparatus as claimed in claims 1 where the output layer of nodes has two nodes.

4. Radar apparatus as claimed in claim 1 wherein at least one layer of nodes in said neural network includes a constant output node for providing local biassing.

5. Radar apparatus as claimed in claim 1 wherein said array of independent radar receiving sensor elements is a two dimensional array.

6. Radar apparatus as claimed in claim 1, further including means for carrying out a Fast Fourier Transform on said data vectors.

7. Radar apparatus for determination of the location of a point source comprising:

a two dimensional array of independent radar receiving sensor elements, each element for providing an output, signal processing means for providing image information in the form of data vectors corresponding to and dependent on each array element, and an adaptive feed forward artificial neural network for calculating a position vector from a single pass of the image information, said network comprising an input layer of nodes containing one node for each sensor in the array, a hidden layer of nodes and an output layer of two nodes, one of said two nodes in said output layer for providing data relating to azimuth and the other of said two nodes for providing information relating to elevation, with a constant output node included in each of said input layer and said hidden layer.

* * * * *